Aug. 18, 1959      D. W. HAIR      2,899,753
WHEEL-TRACK GAUGE FOR MOTOR VEHICLES

Filed Dec. 4, 1957      2 Sheets-Sheet 1

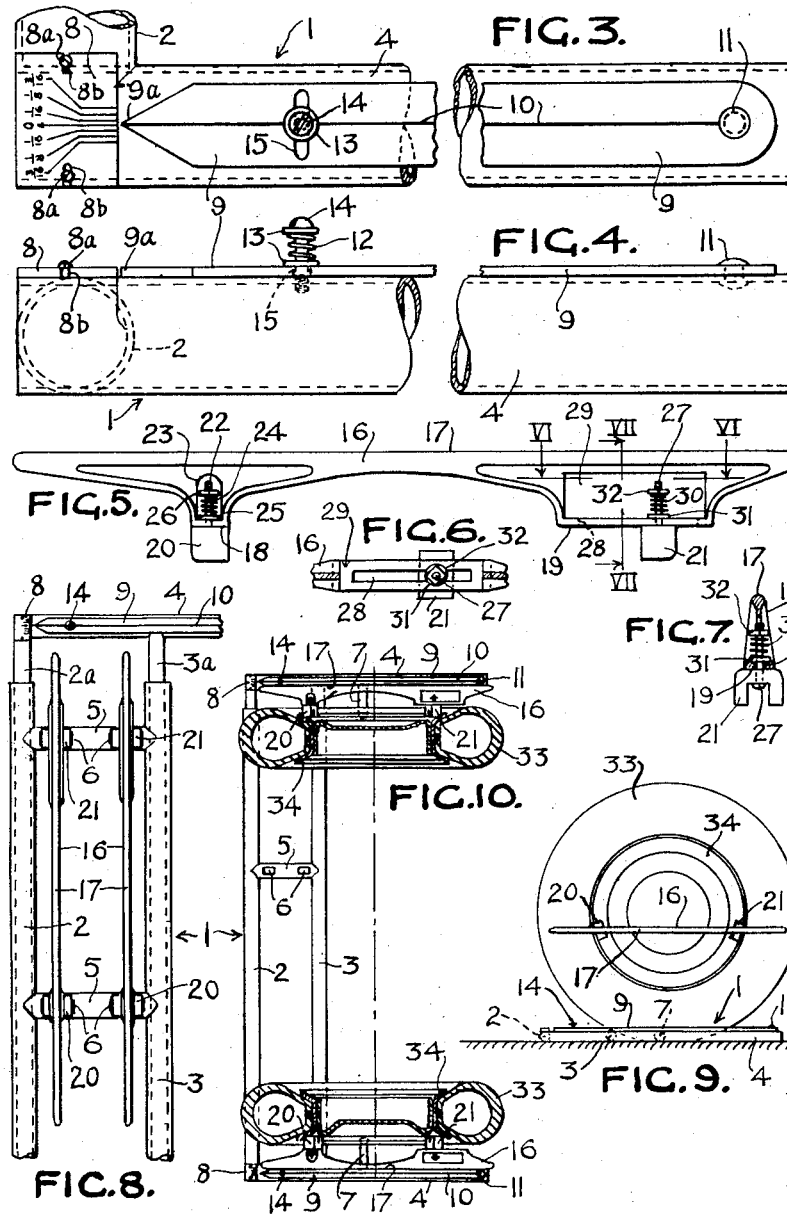

United States Patent Office 2,899,753
Patented Aug. 18, 1959

2,899,753

WHEEL-TRACK GAUGE FOR MOTOR VEHICLES

Douglas Walter Hair, New Plymouth, New Zealand

Application December 4, 1957, Serial No. 700,643

Claims priority, application New Zealand, December 4, 1956

8 Claims. (Cl. 33—203.21)

The invention relates to a gauge for use in tracking the front wheels of motor vehicles so that the wheels shall be in true parallelism or shall have the correct amount of toe-in or toe-out according to the makers' recommendations.

Hitherto the operation of retracking the front wheels of motor vehicles for correct alignment has been regarded as a task that should be carried out only by specialists if extreme accuracy is required. Precision equipment enabling such accuracy to be obtained is expensive and consequently is available only in a relatively few service garages which specialize in retracking operations.

For use by small service garages there is on the market a portable tracking gauge having a wobble-plate in the form of a shallow ramp on to which a front wheel of a vehicle is run and which, under the action of the wheel, serves to move a pointer over a scale according to the angle of approach of the wheel as it passes onto the plate. This gauge is not very satisfactory in use, firstly because it necessitates repeated movement of the vehicle to cause the wheel to roll onto and off the plate while adjustments to the track connections are being made, and secondly because the final result is still somewhat uncertain and speculative.

The object of the present invention is to provide, for the purpose in question, a gauge which is of simple form, can be manufactured and sold at a moderate price, is easy to use, enables the retracking operation to be carried out with precision and speed and without the need for a high degree of skill, and is otherwise of such construction that it can be readily made available to all service garages and stations as part of the normal equipment.

A gauge when constructed in accordance with one embodiment of the invention is illustrated in the accompanying drawings, in which:

Figure 3 is a fragmentary plan view illustrating a portion of the gauge to an enlarged scale;

Figure 4 is an end view corresponding to Figure 3;

Figure 5 is a plan view of another part of the gauge to a scale greater than that of Figures 1 and 2 but smaller than that of Figure 3 and 4;

Figure 6 is a fragmentary sectional view on the line VI—VI of Figure 5;

Figure 7 is a sectional view on the line VII—VII of Figure 5;

Figure 8 is a plan view corresponding to a portion of Figure 1, but showing how the parts of the gauge may be conveniently placed together when the gauge is not in use;

Figure 9 is an outside elevational view of one of the steerable wheels of a vehicle, showing how the gauge is used, and Figure 10 is a plan view, partly in section, corresponding to Figure 9.

Figure 1:
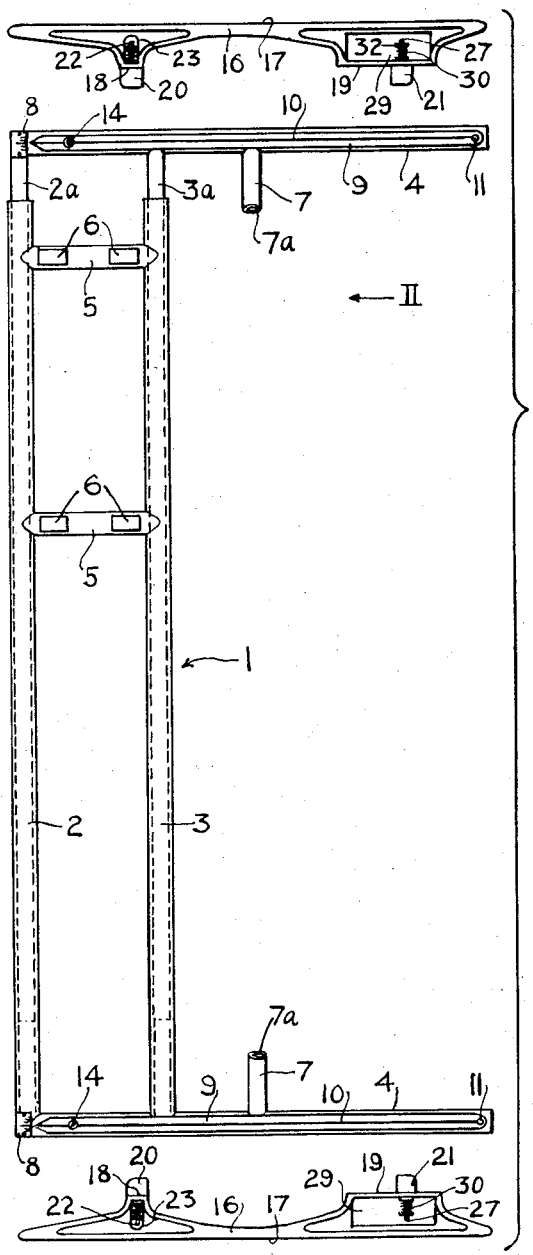
Figure 1 is a plan view of the complete gauge.

As shown in the drawings, the gauge comprises a frame generally indicated at 1 and including a front tubular bar 2 and a rear tubular bar 3, these bars being spaced parallelly with each other and joined at their ends to tubular arms 4 arranged at right-angles to the bars 2 and 3. The arms 4 extend from the bar 2 to a point lying rearwardly of the bar 3 so that the frame 1 is generally of reclining U-shape as shown most clearly in Figure 1. The bars 2 and 3 are reinforced by two transverse members 5 which are spaced from each other and on the upper surfaces of which there are secured a total of four iron platforms 6 for a purpose to be described.

Figure 2:
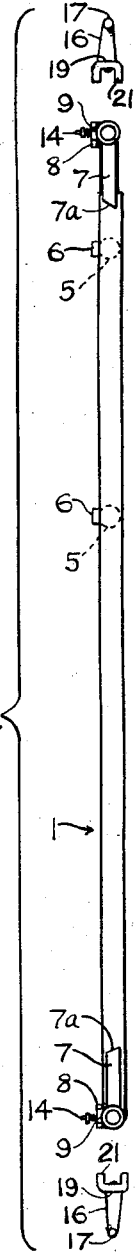
Figure 2 is an edge view looking in the direction of the arrow II in Figure 1.

For a purpose also to be described, the portions of the arms 4 extending rearwardly of the bar 3 are fitted with oppositely disposed and inwardly projecting stubs 7 the free ends of which are chamfered as indicated at 7a in Figures 1 and 2.

Preferably, and as shown in Figures 1 and 8, the frame 1 is made of telescopic form so that the distance between the arms 4 can be increased and decreased according to requirements. To this end, the bars 2 and 3 are made up of outer tubes joined to one of the two arms 4, and inner tubes fitting closely but slidably in the outer tubes and joined to the other one of the two arms 4, the inner tubes being indicated at 2a and 3a respectively.

Over the two corners where the bar 2 joins the arms 4 there are secured scale plates 8, each plate being marked with graduations extending from the rear edge of the plate. As clearly shown in Figure 3, each set of graduations includes a zero or central point and lines lying on either side of that point and respresenting degrees of toe-in and toe-out increasing by increments of, say, one sixteenth of an inch between one line and the next. The plates 8 are held in position by screws 8a which pass through slots 8b in the plates, thereby enabling the plates to be adjusted for correct centre during assembly of the gauge.

For use in conjunction with the scale plates 8 there are provided pointers 9 extending along the upper surfaces of the arms, each pointer being marked with a longitudinally extending centre-line 10. The pointers 9 are pivotally connected at their rear ends to the rear end parts of the arms 4 by means of pivot pins 11, while the forward ends of the pointers are sharpened as indicated at 9a and lie close to the graduations marked on the scale plates 8. With this arrangement, the pointers 9 can be swung in a horizontal plane about the axes of the pivot pins 11 so that the sharpened ends 9a of the pointers move along the graduations on the scale plates 8. When the pointers 9 are so positioned that the centre lines 10 thereon are in exact register with the zero points on the scale plates 8, the lines 10 will be in exact parallelism with one another, while when the pointers are swung outwardly or inwardly of those points, the lines 10 will diverge from or converge towards one another, thus giving a measure of toe-in or toe-out when considered in conjunction with the graduations on the scale plates 8.

Means are provided for frictionally holding the pointers 9 against movement when they have been swung to their selected positions. To this end, there are provided small helical springs 12 (Figures 2 and 4) acting between upper and lower washers 13 (Figures 3 and 4) arranged around screws 14 which pass freely through slots 15 extending across the pointers 9, the screws being threaded into the arms 4. The springs 12 act to press the pointers 9 resiliently down upon the arms 4 so that the pointers are held by sufficient friction to prevent them moving out of place of their own accord once they have been set in selected positions.

For use in conjunction with the frame 1 there are provided two identical comparison bars 16 made from nonmagnetic metal such as aluminium. The bars 16 are of approximately the same length as the arms 4 of the frame 1 and, as shown most clearly in Figures 5 to 7, each bar is formed with a straight edge 17 and with two flat faces 18 and 19 spaced from each other and lying in parallelism with the straight edge 17, the face 19 being longer than the face 18.

Each comparison bar is fitted with two permanent horse-shoe magnets 20 and 21.

The magnet 20 fits against the face 18 of the bar 16, being so positioned that its two pole-pieces extend away from the face, and is held rotatably but frictionally in this position by a screw 22 (Figures 1 and 5) which passes through a hole in the face 18 and projects into an opening 23 formed in the bar. The part of the screw 22 lying within the opening 23 is fitted with a helical spring 24 which is maintained in compression between a washer 25 and a nut 26 on the screw.

The magnet 21 fits against the face 19 of the bar 16, being again so positioned that its two pole-pieces extend away from the face. In this instance, the magnet 21 is mounted for both a rotatable and a sliding movement relatively to the face 19. For this purpose, the magnet is carried by a screw 27 which passes freely through a slot 28 (Figures 5, 6 and 7) formed in and extending along the face 19, and projects into an elongated opening 29 formed in the bar 16. The part of the screw 27 lying within the opening 29 is fitted with a helical spring 30 which is held in compression between a washer 31 and a nut 32 on the screw 27. With this arrangement, the magnet 21 can be rotated about the axis of the screw 27 and can also be moved along the bar 16 so as to vary the distance between this magnet and the magnet 20. The friction set up between the magnet 21 and the face 19 under the action of the spring 30, is sufficient to hold the magnet in the position to which it has been adjusted.

The open ends of the arms 4 and stubs 7 may be plugged to prevent the ingress of dirt.

For checking the front wheel alignment of a motor vehicle and enabling any necessary adjustments to be made for parallelism, or for toe-in or toe-out, according to the makers' specification, the gauge is used as follows, reference now being made more particularly to Figures 9 and 10:

With the aid of the graduations on one of the scale plates 8, the corresponding pointer 9 is set so that its centre-line 10 is brought into exact register with the zero point on this scale plate. With the aid of the graduations on the other scale plate, the corresponding pointer is set in accordance with the correct setting of the front wheels as recommended by the makers. For example, if the makers recommend a toe-in of one-eighth of an inch, the second pointer is set so that the centre-line thereon comes into register with the graduation on the adjacent scale plate which indicates one-eighth of an inch inwardly of the zero, or true parallelism, point.

With the front wheels 33 (Figures 9 and 10) of the vehicle in straight-ahead position as judged by the eye or by any marking that the makers may have provided on the steering wheel, the frame 1, while lying flat on the ground in front of the vehicle, is pushed towards the front wheels so that the portions of the arms 4 extending rearwardly of the bar 3 are brought to a position in which they lie adjacent the outsides of the two wheels 33 (see Figure 10), while the bar 3 is brought to a position in which it has even contact with the treads of the tyres of the wheels (see Figure 9). In this position of the bar 3, the inner ends of the stubs 7 have contact with the outer walls of the tyres where these come close to the ground, the stubs thus acting to centralise the frame relatively to the wheels 33. The inner ends 7a of the stubs 7, by being chamfered, allow for the natural bulge of the tyres and thus fit snugly against the outer side walls thereof.

Where the frame 1 is of telescopic form as already described, it is expanded before being presented to the wheels 33 and thereafter contracted so as to bring the inner ends 7a of the stubs 7 into contact with the outer side walls of the tyres, the frame then being suitable for application to different makes of vehicles in which the distance between the front wheels varies from one make to another.

With the frame in position as explained, the comparison bars 16 are presented, magnets 20 and 21 foremost, to the outsides of the rims 34 of the wheels 33, the bars being held so that they extend horizontally across the hubs and preferably a little below the axis of rotation of the wheels. While each comparison bar is so held, the magnets 20 and 21 are partly rotated and the magnet 21 is moved along its face 19 so that when the bar is in final position, the two magnets will fit snugly against the inturned part of the rims 34, one magnet lying forwardly and the other rearwardly of the axis of rotation of the wheel as shown in Figures 9 and 10. As soon as the magnets are brought into contact with the rim at horizontally spaced points as just described, they will, by magnetic attraction, adhere to the rim, and thus serve to hold the bar 16 in position against the wheel to which it has been applied. By reason of the fact that the magnets 20 and 21 of each bar 16 are in true parallelism with the straight edge 17 of the bar, they will, when mated with the same part of the rim 34 but at spaced horizontal points as explained, ensure that the straight edge 17 will give a true indication of the setting of the wheel in the direction of movement of the vehicle.

As the magnets 20 and 21 of both bars 16 serve to hold the bars against the rims 34 only by magnetic attraction, any slight adjustment to the magnets and bars that may be necessary to ensure that the bars are correctly applied, can be made while the bars are in attached position.

Now that the bars 16 have been applied, a steering movement is now applied to the wheels 33 so that the wheel lying adjacent the pointer 9 that was set at zero position, is brought to true straight ahead position, this latter position, being determined by looking downwardly along the straight edge 17 of the corresponding comparison bar 16 and comparing this edge with the centre line 10 on the pointer. If the straight edge 17 is seen to be in true coincidence with the centre line 10, it will be known that the wheel is, in fact, in a true straight-ahead position. If the eye observes any divergency, the steering wheel can be manipulated until true coincidence is observed.

As soon as the first wheel has been set in straight-ahead position, a sight is taken downwardly along the straight edge 17 of the comparison bar on the other wheel, this edge being compared with the centre line 10 on the corresponding pointer 9. If the edge and the line are in true coincidence, it will be known that both wheels are correctly set. If there is any divergence, adjustments are made to the tie-rod connections forming part of the steering mechanism of the vehicle, until coincidence is established.

The mode of use of the gauge as described in the foregoing is not necessarily invariable. When, for example, the wheels 33 have to be set for a particular amount of toe-in or toe-out and the vehicle is fitted with double tie-rods, the total amount may be divided equally between the two pointers 9, each wheel then being individually adjusted after sighting the straight edge 17 of the associated comparison bar 16 against the centre line 10 of the corresponding pointer 9.

Figure 8 shows a convenient way of assuring that the comparison bars 16 will not become mislaid when the gauge is not required for use. For this purpose, the bars are placed so that they bridge the gap between the transverse members 5 of the frame 1, the magnets 20 and 21 then adhering, by magnetic attraction, to the iron platforms 6 on the members 5. In this way, the bars 16 become attached to the frame, thus enabling the gauge as a whole to be hung up out of the way in a convenient place.

Within the scope of the invention certain modifications are contemplated, such modifications rendering the gauge suitable for use in the assembly line of a factory in which motor vehicles are manufactured or assembled.

In one such modification and where the factory produces vehicles in which the setting of the front wheels is always the same, the arms 4 may be permanently set to indicate true parallelism, or in-toe, or out-toe, according the specified setting for the wheels, the scale plates 8 and pointers 9 then being dispensed with and the comparison bars 16 then being used in conjunction with the arms themselves, or with centre line markings thereon, to indicate the specified setting.

In another modification, the frame 1 may consist merely of the bar 3 and the arms 4, the bars being fixed to the floor at that part of the assembly line where the wheel-tracking operation is performed, and the arms being represented by markings applied to the floor, the markings being, if necessary, graduated to allow for differing designs of vehicles passing along the line. In the interests of permanency, the markings, including any necessary graduations, may be constituted by metal strips let into the floor so that their upper edges are visible. The upper edges may, if desired, project slightly above the floor so that they are always readily distinguishable.

What I claim is:

1. A wheel-track gauge for motor vehicles, comprising a frame having parallelly arranged tubular bars spaced from each other in a horizontal plane, and one of which can be placed against the treads of the steerable wheels of the vehicle; a first arm extending at right-angles to the said bars and joined to one end thereof; a second arm also extending at right-angles to the said bars and having laterally projecting members engaged slidably in the other end of the said bars; pointers mounted on and extending along the said arms, the pointers being pivotally connected at one end to the arms so that their opposite ends can be moved in relation to graduation markings on the frame, each pointer being provided with a longitudinally disposed line; and two comparison bars having straight edges and fitted with spaced magnets for engagement with the rims of the steerable wheels at opposite sides of the axes thereof so that the comparison bars will then be held to the rims by magnetic attraction, thus allowing the straight edges of the comparison bars to be sighted in conjunction with the lines on the pointers, for comparing angles.

2. A wheel-track gauge in accordance with claim 1, and wherein the parallelly arranged tubular bars consist of a front bar and a rear bar, the said arms extending from the front bar to a point lying rearwardly of the rear bar.

3. A wheel-track gauge in accordance with claim 2 and wherein the portions of the said arms extending rearwardly of the rear tubular bar are formed with oppositely disposed and inwardly projecting stubs.

4. A wheel-track gauge in accordance with claim 2 and wherein the front and rear tubular bars are reinforced by transverse members spaced from each other and on the upper surfaces of which there are provided iron platforms with which the magnets on the comparison bars can be engaged.

5. A wheel-track gauge in accordance with claim 1 and wherein means are provided for frictionally retaining the pointers in the selected positions relatively to the graduation markings on the frame.

6. A wheel-track gauge in accordance with claim 1 and wherein each comparison bar is formed with two flat faces spaced from each other and lying in parallelism with the straight edge of the said bar, a permanent magnet being applied against each of the said faces and connected to the bar.

7. A track gauge in accordance with claim 6 and wherein the said magnets are of the horse-shoe type and are mounted for rotation on said flat faces.

8. A track gauge in accordance with claim 6 and wherein one of the magnets is mounted for movement towards and away from the other magnet.

References Cited in the file of this patent

UNITED STATES PATENTS

| | | |
|---|---|---|
| 1,138,736 | Dedreux | May 11, 1915 |
| 1,449,289 | King | Mar. 20, 1923 |
| 2,000,993 | Schmidt | May 14, 1935 |
| 2,285,965 | Halstead | June 9, 1942 |
| 2,556,227 | Shaw | June 12, 1951 |
| 2,577,841 | Creagmile | Dec. 11, 1951 |
| 2,616,186 | Shooter et al. | Nov. 4, 1952 |